Figure 1:
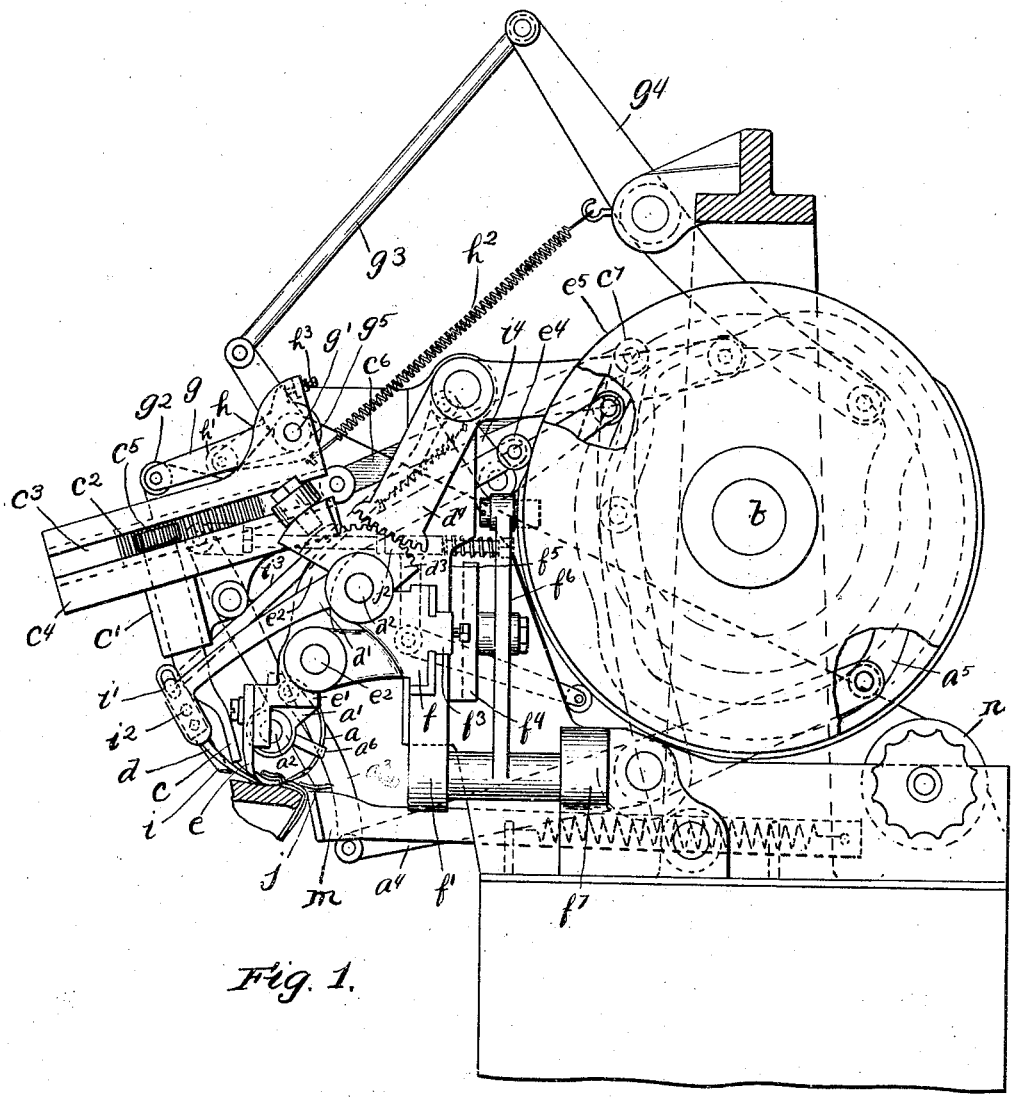

E. A. WEBSTER.
CHAIN STITCH SHOE SEWING MACHINE.
APPLICATION FILED JULY 23, 1910.

1,059,919.

Patented Apr. 22, 1913.

3 SHEETS—SHEET 1.

Witnesses:
H. B. Davis
H. A. Best

Inventor;
Edwin A. Webster
by Roy ? Hammann
Atty's

E. A. WEBSTER.
CHAIN STITCH SHOE SEWING MACHINE.
APPLICATION FILED JULY 23, 1910.

1,059,919.

Patented Apr. 22, 1913.

3 SHEETS—SHEET 2.

Witnesses:
H. B. Davis
H. A. Burt

Inventor:
Edwin A. Webster
by Roger & Harriman
Attys

E. A. WEBSTER.
CHAIN STITCH SHOE SEWING MACHINE.
APPLICATION FILED JULY 23, 1910.

1,059,919.

Patented Apr. 22, 1913.
3 SHEETS—SHEET 3.

Witnesses:
H. B. Davis.
H. A. Best

Inventor:
Edwin A. Webster
by Noyes & Harriman
Atty's

UNITED STATES PATENT OFFICE.

EDWIN A. WEBSTER, OF GROVELAND, MASSACHUSETTS, ASSIGNOR TO HAVERHILL SHOE MACHINERY COMPANY, OF HAVERHILL, MASSACHUSETTS, A CORPORATION OF MAINE.

CHAIN-STITCH SHOE-SEWING MACHINE.

1,059,919.

Specification of Letters Patent.

Patented Apr. 22, 1913.

Application filed July 23, 1910. Serial No. 573,424.

*To all whom it may concern:*

Be it known that I, EDWIN A. WEBSTER, of Groveland, county of Essex, State of Massachusetts, have invented an Improvement in Chain - Stitch Shoe - Sewing Machines, of which the following is a specification.

This invention relates to certain improvements in chain-stitch, shoe-sewing machines, which are ordinarily employed in sewing the upper to the sole in turned and welted shoes, and more particularly to the type of machine shown and described in the patent to French & Meyer, #412,704, dated October 8, 1889. In the operation of this machine, the take-up operates to set the stitch and to pull off thread from the tension wheel as the needle is advanced through the work to loop-receiving position, the take-up being immediately lowered, giving off thread to the auxiliary take-up, which supplies thread under a weak tension to the thread finger, looper and needle for the formation of the next stitch. With this timing, and operation of the parts, while the stitch may be set with sufficient tightness, particularly if a strong tension is employed, by the momentary pull placed on the thread by the take-up, as it is lifted, and as it draws the thread from the thread wheel, yet I have discovered that this pull is exerted for such a short space of time that the leather will not yield to the thread sufficiently, in the time afforded, to permit the stitch to be set as tightly as it might be with a lighter tension, under other conditions. In said prior machine, a thread finger is also employed which engages the thread between the looper and the needle and draws aside a certain amount of thread to be delivered to one leg of the needle loop, as the needle draws the loop through the work, but I have ascertained that, while this device will operate in the desired manner when the machine is operated at a certain speed, which, in practice, is the highest speed at which the machine is to be operated, if it is operated at a lower speed, as is frequently necessary in sewing certain portions of the shoe, the auxiliary take-up will draw back some of the thread previously drawn aside by the thread finger; so that the thread renders in the needle hook in one direction at the beginning of the return movement of the needle, and must render in the opposite direction during the latter portion of the loop-drawing operation. I have further ascertained that the movement of the channel guide from the needle, which must occur while the needle is in the work, causes, in prior machines, a severe transverse strain on the needle, which frequently causes the same to become bent out of line and broken.

The objects of my invention are to provide a machine of the type above referred to, which is provided, essentially, with only the operating devices common to machines of said type, and in which sudden and undue variations in tension strain on the thread shall be prevented, thread breakage will be reduced, and the shoe will constantly be held in position in the machine without material assistance by the operator, thereby enabling the shoe to be easily and accurately guided without special effort on the part of the operator.

A further object of my invention is to provide a chain-stitch sewing machine of the above described character, in which means are provided whereby the stitches may be more tightly set with a certain thread tension than they are with similar prior machines having the same thread tension; whereby rendering of the thread in the needle hook is prevented under all conditions of speed, and whereby transverse strain on the needle caused by the return movement of the channel guide is also prevented.

I accomplish these objects by maintaining a taut thread at all times during the formation of the stitch, so that the shoe is held in position by the thread when not held by the work engaging parts of the machine and the stitch, when set, will be firmly held until the leather yields under the maintained tension and then by tightening the thread under full tension again, so that the slack thread thus provided is taken up, and an extra stitch setting operation is performed: and further, by so timing the looper with relation to the feeding movement of the channel guide that it acts, through the medium of the thread, to counteract fully the transverse strain thereon by the channel guide.

For a more complete understanding of my invention reference is made to the accompanying drawings, in which—

Figure 8:
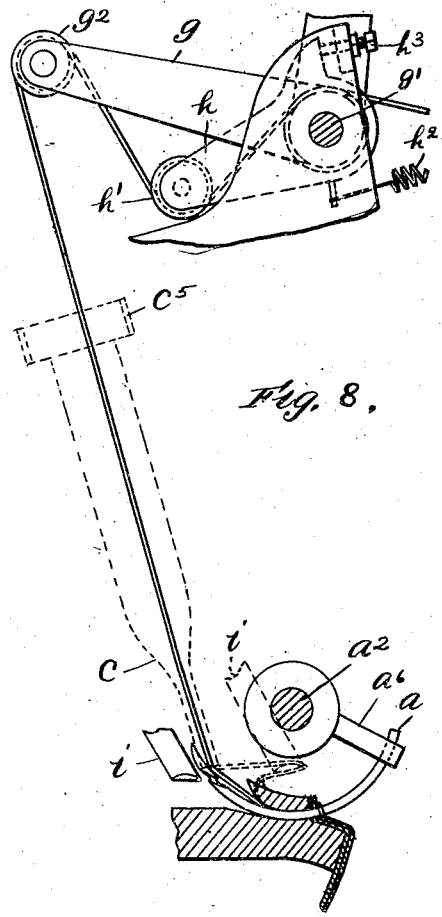
Figure 9:
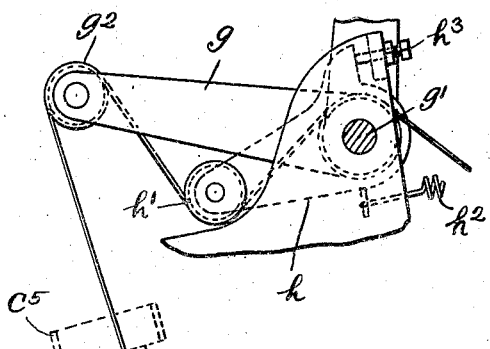
Figure 10:
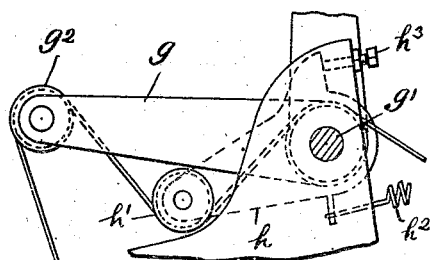
Figure 11:
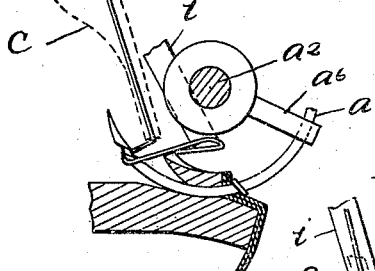
Figure 11:
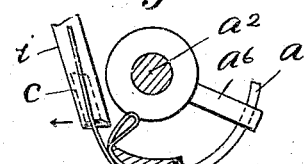
Figure 12:
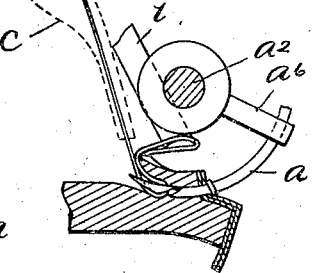
Figure 12:
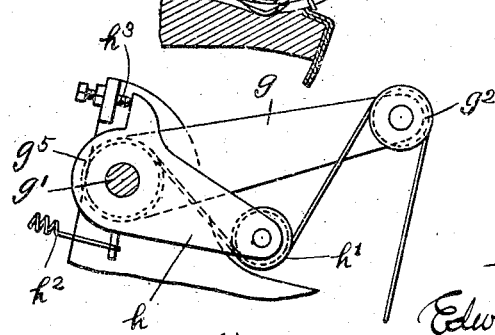

Figure 1 is a side elevation of a shoe sewing machine embodying my invention. Figs. 2 to 7 inclusive are detail plan views, showing different positions of the stitch-forming mechanism. Figs. 8, 9 and 10 are side elevations of the stitch forming and take-up mechanism, showing the parts in different positions. Fig. 11 is a similar view of the stitch forming mechanism showing the parts in still another position. Fig. 12 is a detail view of the take-up and thread tightening devices.

The machine illustrated in the drawing is similar, in many respects, to the machine disclosed in said prior patent of French & Meyer #412,704 above referred to, and, so far as the instrumentalities thereof are concerned, no novelty is claimed therefor, the invention residing principally in the timing of these instrumentalities. For the purpose of identification, however, the various parts will be briefly described.

$a$ indicates the curved, hooked needle carried on the needle segment $a'$ and oscillated on a shaft $a^2$ by means of a link $a^3$ connected to said segment, and a cam lever $a^4$ oscillated by a suitable cam $a^5$ on cam shaft $b$, the needle being arranged to move in a needle guide $a^6$.

The looper $c$ is rotatably mounted in a bearing $c'$, supported on the frame of the machine, and is rotated to perform the looping operation by means of a rack bar $c^2$, reciprocally mounted in guide ways $c^3$ formed in the nose $c^4$, said rack bar engaging a pinion $c^5$, mounted on the end of the looper, and being reciprocated by means of a link $c^6$ connected to a cam lever $c^7$, (indicated in dotted lines in Fig. 1), and oscillated by a cam on the cam shaft.

The feed mechanism comprises a feed point $d$ mounted on the end of an arm $d'$, said arm being adapted to swing about a pivot $d^2$ and having a gear segment $d^3$ in mesh with a gear segment on the end of one arm of a cam lever $d^4$, which is oscillated by a suitable cam on the cam shaft. The channel guide $e$ is mounted on one arm $e'$ of a lever pivoted on a shaft $e^2$, the opposite arm $e^3$ of said lever having a cam roll $e^4$ disposed to engage the surface of a cam $e^5$ on the cam shaft. Said shafts $d^2$ and $e^2$ are both mounted on a feed slide $f$, which is mounted to reciprocate horizontally and longitudinally of the needle shaft, in the bracket $f'$ mounted on the frame of the machine, said bracket having a longitudinal slot extending therethrough between the guideways of the feed slide, and said feed slide having a projecting portion $f^3$ on which is mounted a guide way plate $f^4$, in which a slide $f^5$ is mounted to reciprocate vertically, said slide $f'$ being connected to the middle portion of a T-shaped cam lever $f^6$, the T ends of which are mounted to oscillate in the bracket $f'$ and in a bearing $f^7$ on the frame of the machine, the opposite end of said lever $f^6$ being engaged by a suitable cam on the cam shaft $b$. By this means the feed point and channel guide are moved in the customary manner to feed the work.

The take-up lever $g$ is mounted to swing on a shaft $g'$, and is provided with a thread roll $g^2$ in its extreme end, said lever $g$ being oscillated by means of a link $g^3$, connected to a cam lever $g^4$, which is oscillated by a suitable cam on the cam shaft. A thread roll $g^5$ is also mounted on the shaft $g'$. A thread tightening arm $h$ is mounted to swing on the shaft $g'$ and is provided with a thread roll $h'$ on its end beneath which the thread passes as it is carried from the roll $g^5$ to the roll $g^2$. A spring $h^2$ is connected to the arm $h$ at one side of its pivot and to the frame, and acts to throw said arm $h$ downwardly, and a stop-screw $h^3$ is provided on the frame for limiting the upward movement of said arm. The thread finger $i$ is mounted on a lever $i'$, pivoted at $i^2$ on the frame, and oscillated by means of a link $i^3$ connected at one end to the upper end thereof and at the other end to a cam lever $i^4$.

The back gage $j$, back rest $m$, and tension of wheel $n$ are of common form, the thread passing about said wheel $n$, to secure the desired friction engagement therewith as it is drawn from the supply, and passing over the roll $g^5$ under roll $h'$, over roll $g^2$ and down through the looper $c$, in the usual manner. Assuming that a stitch has been taken, so that the thread is fastened to the work, that the needle is holding a loop of thread in its rear-most position, the take-up $g$ being in its lowest position, and the thread tightener $h$ being held by the thread against its stop, as shown in Figs. 1 and 12 and that the feeding motion has just taken place, so that the relative position of the parts is that shown in Fig. 2. The operation from this point is as follows: As the needle is advanced, the take-up is lifted correspondingly, and, as the needle enters the between substance, or work, the loop will slip back on the shank of the needle, and the take-up will draw the loop tight about said shank and set the stitch. The thread tightener will at this time be drawn against its stop $h^3$, and the upward movement of the take-up is continued until it draws sufficient thread from the tension wheel $n$ for the next stitch, preferably reaching its extreme elevated position by the time the needle reaches its extreme forward position and dwells to receive the loop. The above described operation is substantially as described in said French & Meyer patent. The thread finger $i$, which, during this movement, has been held in its retracted position out of engagement with the thread, as shown in Fig. 3, is then advanced into engagement therewith, drawing a loop thereof to one side between the point where the thread leaves the work, and the point where it enters the looper, as shown in Figs. 4 and 9. During this movement of the thread finger the take-up dwells in its extreme elevated position, so that an additional pull is placed on the thread by the movement of the thread finger, equal to the full tension. Thread for this movement is drawn from two sources, first from the stitch which has been set, by reason of further yielding of the leather between the time when the stitch was first set by the take-up, and the time when the thread finger is moved back to draw aside the loop, and second from the tension wheel. The take-up may be slightly lowered during this movement of the thread finger, so that some thread may also be supplied from this source, but, in order to perform the supplemental setting of the stitch in the manner above described, the amount of thread given off by the take-up to the thread finger must be materially less than the amount of thread required for the loop which is drawn aside by the thread finger. It will therefore be understood that the reference to the "dwell" of the take-up, in the specification and claims is merely relative as to the movement of the thread finger, and to be distinguished from a timing in which the full supply of thread, for the thread measuring movement of the thread finger, is derived either indirectly from an auxiliary take-up, after the main take-up has been lowered, or directly from the take-up by the lowering thereof at a speed sufficient to supply the full thread requirements of the thread finger.

Figure 2:
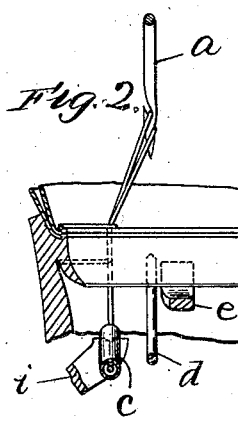
Figure 3:
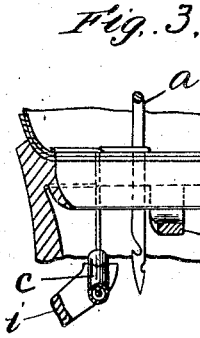
Figure 4:
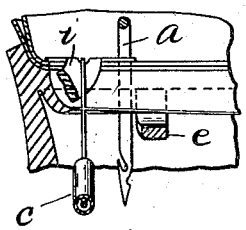
Figure 5:
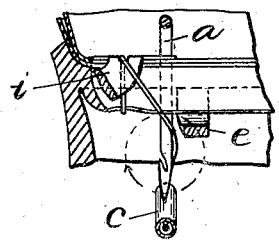
Figure 6:
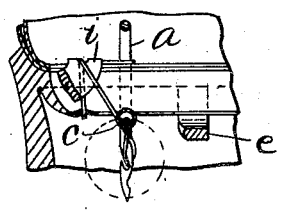

During the forward movement of the needle, the channel guide e will be held as closely adjacent the path of the needle as practicable, as shown in Figs. 2, 3 and 4, the return movement of the channel guide, away from the needle being accomplished while the needle is in work. According to my invention, after the supply of thread has been drawn aside by the thread finger, the looper, starting from the position of Fig. 4, is moved about the needle in the rear thereof to a position directly in front thereof, so that the thread is drawn from the thread finger and laid against the side of the needle next the channel guide, as shown in Fig. 5. At the same time the take-up is lowered sufficiently to supply thread for this purpose, without decrease of the full tension which is placed on the thread by the thread tightener h. As soon as the thread is laid against the shank of the needle, as shown in Fig. 5, the return movement of the channel guide e is started, and is finished as the looper reaches a position in the rear of the needle, as shown in Fig. 6, the feed point, at the same time, being thrown out of engagement with the work and also returned. As the channel guide is moved in the channel, during its return movement, and is at this time only withdrawn slightly from the channel, there is a strong frictional engagement between the channel guide and the shoe, which tends to pull the shoe in the same direction; this tendency being resisted by the needle, but, as, during the return movement of the channel guide, the thread is drawn forcibly against the side of the needle next the channel guide from the opposite side thereof, under the full tension of the thread tightener, during the entire return movement of the channel guide, it will be apparent that the thread is thus caused to resist the pull of the channel guide on the needle. All transverse strain on the needle, either due to the relatively high tension at which the thread is held during the looping operation, or to the pull on the work by the channel guide, is practically avoided, as these strains are counterbalanced.

Figure 7:
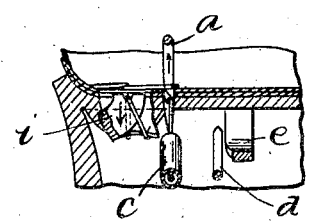

The movement of the looper about the needle is continued until it assumes a position in front of the needle, as shown in Fig. 7, the take-up being lowered sufficiently to give off enough thread to permit the looper to finish its operation, and at the same time to maintain a taut thread under the full tension of the thread tightener. The needle is then retracted to draw its loop toward the work, the take-up being lowered fast enough to supply thread for this purpose.

The thread finger is held substantially in its loop-holding position, of Figs. 4 to 7 and Figs. 9 and 10, until the thread which has been laid in the hook of the needle is actually drawn into contact with the work, as shown in Fig. 10, and then it is moved back so that it becomes disengaged from the thread, as shown in Fig. 11, so that, during the rest of the return movement of the needle, thread is supplied to the opposite legs of the loop from the loop previously held aside by the thread finger and from the further lowering of the take-up, the take-up reaching its lowest position just previous to the time when the needle reached its rearmost position, so that, when the thread is drawn into the channel, it will be tightened therein under the full tension of the thread tightener. As the tension placed on the thread by the thread tightener, when held in, or adjacent its extreme position, is but slightly less than the full tension which is placed on the thread by the tension wheel, it follows that the stitch will be set practically as tight on the channel-side as on the needle side, thereby forming a tighter stitch, with even less strain on the thread than would otherwise be required to set the stitch by depending solely on the action of the take-up in tightening the loop about the shank of the needle.

By delaying the disengaging movement of the thread finger until the thread is locked by the work in the needle hook, the thread tightener, which at all times places a strong tension on the thread, will not be permitted to draw back any of the thread held aside by the thread finger under any condition of speed, so that the constant maintenance of the thread at a degree of tautness not less than practically the full tension of the thread tightener will not interfere with the thread finger in the performance of its normal or primary function. Inasmuch as the channel guide normally extends to the bottom of the channel and the thread is not locked by the work until the needle loop has been drawn into the between substance beyond the bottom of the channel, it follows that the thread finger does not release its loop until the needle hook has been retracted to a point adjacent or slightly beyond the end of the channel guide. By thus constantly maintaining a taut thread during the formation of the stitch, the thread is caused to hold the shoe in the desired position in the machine at all times, so that, during the greater portion of the sewing operation, the guiding of the shoe is almost entirely automatic, thereby making the machine easy to operate and enabling the production of more uniform work; the holding of the shoe in position during the return movement of the feeding devices being especially important in the accomplishment of this result. It may be observed in this connection that the function of the thread tightener is merely to compensate for slight inaccuracies in the timing of the take-up cam and particularly for variations in the strength and thickness of the stock, so that the thread may be maintained at a high degree of tautness or at a tension strain under all conditions.

Having described my invention, what I claim as new and desire to secure by Letters Patent is as follows:—

1. In a chain-stitch shoe-sewing machine, the combination of stitch-forming and stitch-setting mechanism, including a tension-device, a needle, a take-up and a thread-finger, means to move the take-up to draw the thread about the shank of the needle, while in the work, to pull off thread from the tension device and tighten the stitch under full tension strain, means to cause the take-up then to dwell, with the thread held taut, and means to move the thread-finger to draw aside a loop of thread adjacent the work under full tension strain, while the take-up thus dwells, thereby to take up slack thread due to the yielding of the work to the thread and further tighten the stitch, substantially as described.

2. In a chain-stitch shoe-sewing machine, the combination of an oscillatory, hooked-needle, a thread-finger, a thread-supply, means including a take-up, to set the stitch by drawing the thread about the shank of the needle, while in the work, under a stitch-setting strain, means to move the thread-finger away from the needle to measure off a loop of thread for one side of the needle-loop, and means, including a spring actuated thread-tightener, to maintain the thread under a stitch-setting strain from the time of the stitch-setting operation by the take-up, until after the time of the thread-measuring operation of the thread-finger, and means thereafter to operate the thread-finger to retain its loop, while the thread is still held taut by the thread tightener and without giving up thread thereto through the needle hook, until the needle loop is held from movement in the needle hook by the work, substantially as described.

3. In a chain-stitch shoe-sewing machine the combination of stitch-forming and stitch-setting mechanism including a tension-device, a needle, a take-up, a thread-finger and a spring-actuated thread-tightener, arranged, when moved to its extreme position, to place a stitch-setting strain on the thread of a somewhat less degree than the full tension, means to move the take-up to draw the thread about the shank of the needle while in the work, to pull off thread from the tension-device and tighten the stitch under full tension strain, and to cause the take-up then to dwell with the thread held taut, means to move the thread-finger away from the needle to deflect the taut thread adjacent the work under stitch-setting strain, while the take-up thus dwells, and means thereafter to operate the thread-finger to retain its loop, while the thread is still held taut by the thread-tightener, and without giving up thread thereto through the needle hook, until the needle loop is held from movement in the needle hook by the work, substantially as described.

4. In a chain-stitch shoe-sewing machine the combination of an oscillatory, hooked needle, a looper, a work-feeding-device, a thread-tension, means to move said work-feeding-device toward the path of the needle to feed the work while the needle is withdrawn therefrom, means to advance the needle through the work to loop-receiving position, means to move the looper to lay the thread against the side of the needle next to said feeding-device, means to hold the thread taut, between the tension and the work, during the looping operation, thereby causing a transverse pressure on the needle in one direction, and means to move said feeding device away from the needle in contact with the work, so as to produce a drag thereon in the opposite direction, while the needle is thus pressed, whereby the transverse strain on the needle by the action of the feeding device on the work is counteracted, substantially as described.

5. A chain-stitch shoe-sewing machine having in combination an oscillatory hooked needle, a looper, a channel-guide, a thread-tension, means to move the channel-guide toward the path of the needle during the feeding operation and while the needle is withdrawn from the work, means to advance the needle through the work to loop-receiving position, means to move the looper from a position in the rear of the needle to a position in front thereof, to lay the thread, as it is drawn from the work, against the side of the needle next the channel-guide, and, thereafter, simultaneously to move the looper, to complete its looping operation, and to move the channel-guide away from the needle, while said channel guide is in engagement with the work, to perform its return movement, and means to hold the thread taut during said looping operation, whereby the transverse strain placed on the needle by the work, through the drag of the channel-guide thereon during its return movement, is counteracted, substantially as described.

In testimony whereof, I have signed my name to this specification, in the presence of two subscribing witnesses.

EDWIN A. WEBSTER.

Witnesses:
L. H. HARRIMAN,
H. B. DAVIS.

Copies of this patent may be obtained for five cents each, by addressing the "Commissioner of Patents, Washington, D. C."